US010795222B2

(12) United States Patent
Yabuki et al.

(10) Patent No.: US 10,795,222 B2
(45) Date of Patent: Oct. 6, 2020

(54) DISPLAY DEVICE AND MANUFACTURING METHOD FOR DISPLAY DEVICE

(71) Applicant: Panasonic Liquid Crystal Display Co., Ltd., Himeji-shi, Hyogo (JP)

(72) Inventors: Hiroyuki Yabuki, Hyogo (JP); Kazuhiko Tsuda, Hyogo (JP)

(73) Assignee: Panasonic Liquid Crystal Display Co., Ltd., Hyogo (JP)

( * ) Notice: Subject to any disclaimer, the term of this patent is extended or adjusted under 35 U.S.C. 154(b) by 0 days.

(21) Appl. No.: 16/286,091

(22) Filed: Feb. 26, 2019

(65) Prior Publication Data

US 2019/0271873 A1 Sep. 5, 2019

(30) Foreign Application Priority Data

Mar. 1, 2018 (JP) .................. 2018-036158

(51) Int. Cl.
| | | |
|---|---|---|
| *G02F 1/1345* | (2006.01) | |
| *G02F 1/1339* | (2006.01) | |
| *G02F 1/1362* | (2006.01) | |
| *G02F 1/1343* | (2006.01) | |
| *G02F 1/1368* | (2006.01) | |

(52) U.S. Cl.
CPC ........ *G02F 1/13452* (2013.01); *G02F 1/1339* (2013.01); *G02F 1/136286* (2013.01); *G02F 1/1368* (2013.01); *G02F 1/134363* (2013.01); *G02F 2001/136295* (2013.01); *G02F 2201/42* (2013.01)

(58) Field of Classification Search
CPC .............. H01L 23/5226; H01L 23/481; H01L 2924/14; H01L 2924/01078; G02F 1/13452; G02F 1/136286; G02F 1/1368; G02F 1/1339
USPC ....... 257/774, 59, 72; 438/48, 128, 629, 637
See application file for complete search history.

(56) References Cited

U.S. PATENT DOCUMENTS 4,961,630 A * 10/1990 Baron et al. ...... G02F 1/136213
349/38
2006/0092340 A1* 5/2006 Blum et al. .......... G02F 1/1345
349/13

FOREIGN PATENT DOCUMENTS

JP 2010-126398 6/2010

* cited by examiner

*Primary Examiner* — Thinh T Nguyen
(74) *Attorney, Agent, or Firm* — Hamre, Schumann, Mueller & Larson, P.C.

(57) ABSTRACT

A display device according to a present disclosure comprises: a first glass substrate including a through-hole; a wiring disposed in a first main surface of the first glass substrate; and a terminal formed in a second main surface of the first glass substrate and electrically connected to the wiring through the through-hole.

7 Claims, 21 Drawing Sheets

FIG.6
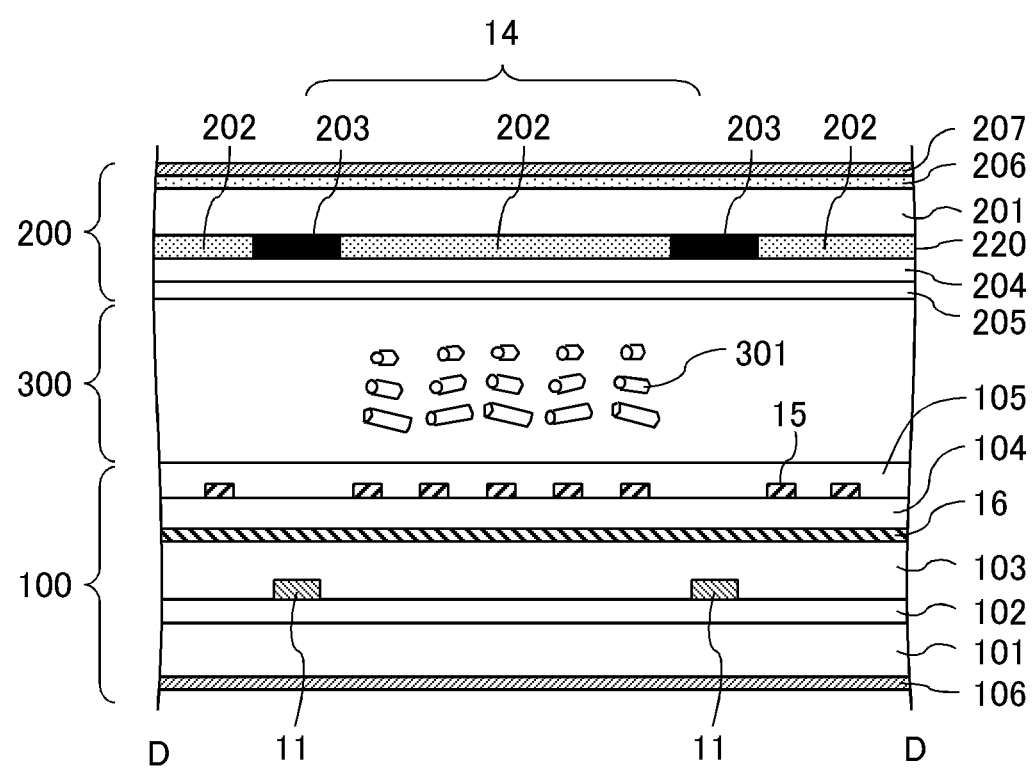
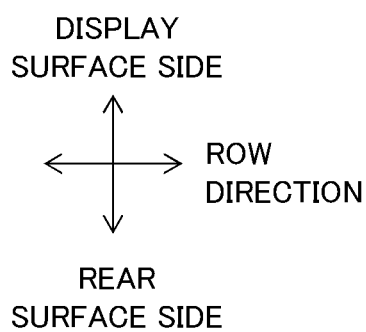

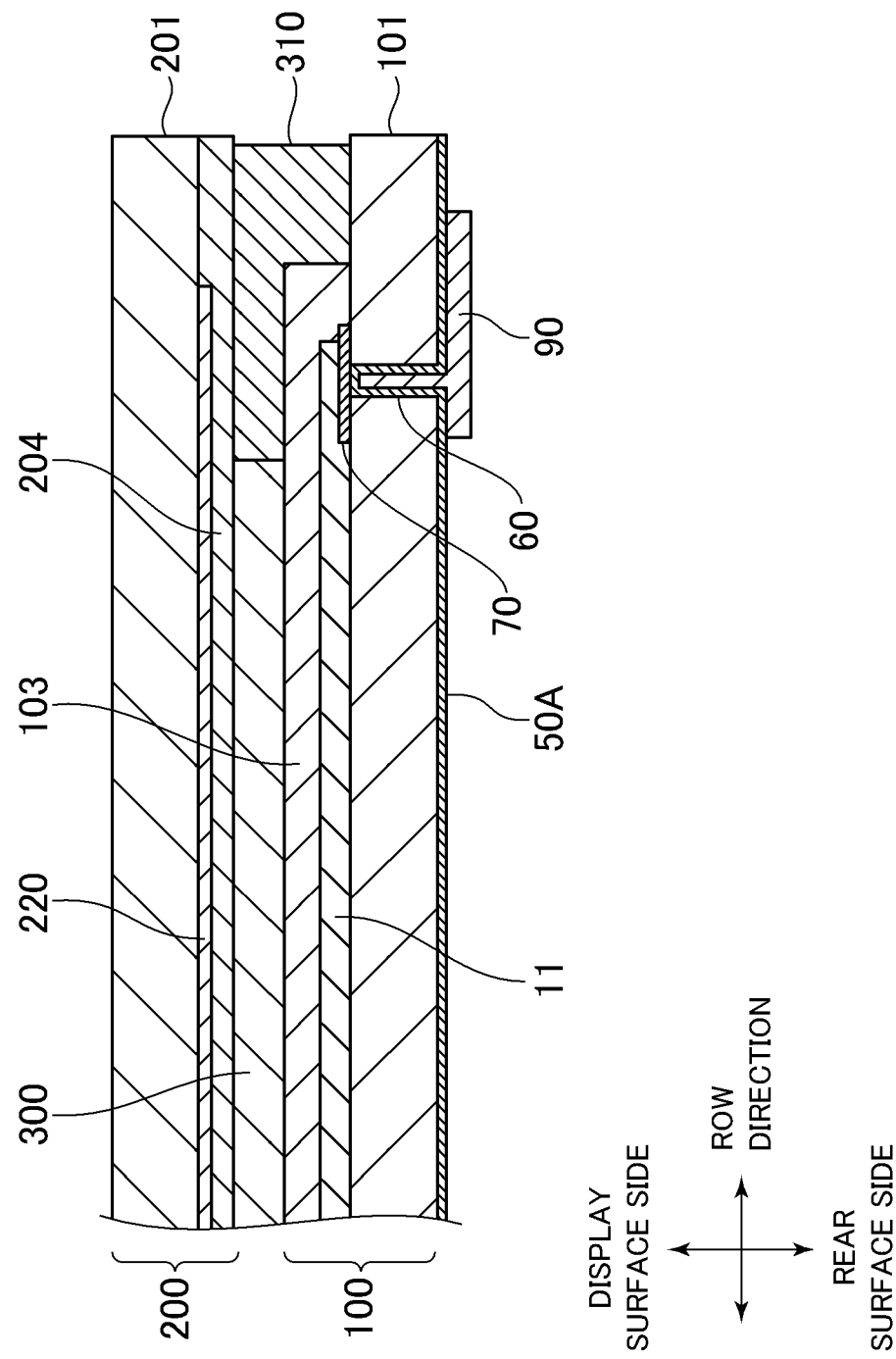

DISPLAY DEVICE AND MANUFACTURING METHOD FOR DISPLAY DEVICE

CROSS-REFERENCE TO RELATED APPLICATION

This application claims priority from Japanese application JP 2018-036158, filed Mar. 1, 2018. This Japanese application is incorporated herein by reference.

BACKGROUND

1. Technical Field

The present disclosure relates to a display device and a method for manufacturing a display device.

2. Description of the Related Art

A conventional display device includes a thin film transistor substrate and a color filter substrate opposed to the thin film transistor substrate, and a driver mounting region where a driver is mounted is formed on a side opposed to the color filter substrate, namely, on a main surface on a display surface side in the thin film transistor substrate. The thin film transistor substrate is formed wider than the color filter substrate in planar view, and includes a portion that overlaps with the color filter substrate and a portion that does not overlap with the color filter substrate. The driver mounting region is disposed in the portion that does not overlap with the color filter substrate in planar view in the main surface on the display surface side of the thin film transistor substrate (for example, see Unexamined Japanese Patent Publication No. 2010-126398).

SUMMARY

In the conventional display device, there has been a problem in that reduction of an area of a frame region around a display region, namely, a so-called narrow frame is provided. That is, in the conventional configuration, it is necessary to provide the driver mounting region in the main surface on the display surface side of the thin film transistor substrate, which results in the problem in that the narrow frame is provided.

The present disclosure has been made in view of the above problem, and an object of the present disclosure is to provide the narrower frame of the display device.

A display device according to a present disclosure comprises: a first glass substrate including a through-hole; a wiring disposed in a first main surface of the first glass substrate; and a terminal formed in a second main surface of the first glass substrate and electrically connected to the wiring through the through-hole.

A method for manufacturing a display device according to a present disclosure comprises: a through-hole forming step of forming a through-hole in a first glass substrate; a wiring forming step of forming a wiring on a first main surface of the first glass substrate; and a terminal forming step of forming a terminal electrically connected to the wiring through the through-hole in the second main surface of the first glass substrate.

The display device according to the present disclosure can provide the narrower frame of the display device.

BRIEF DESCRIPTION OF DRAWINGS

FIG. 6 is a sectional view taken along line D-D in FIG. 4.

FIG. 21 is a schematic sectional view illustrating the method for manufacturing a display device according to the exemplary embodiment.

DETAILED DESCRIPTION

Exemplary Embodiment

An exemplary embodiment of the present disclosure will be described below with reference to the drawings.

[Liquid Crystal Display Device]

A display device according to an exemplary embodiment of the present disclosure will be described below with reference to the drawings. In the exemplary embodiment, a liquid crystal display device will be described as an example. However, the present disclosure is effective as long as an active matrix is formed on a glass substrate in a display device such as an organic electroluminescence display.

Figure 1:
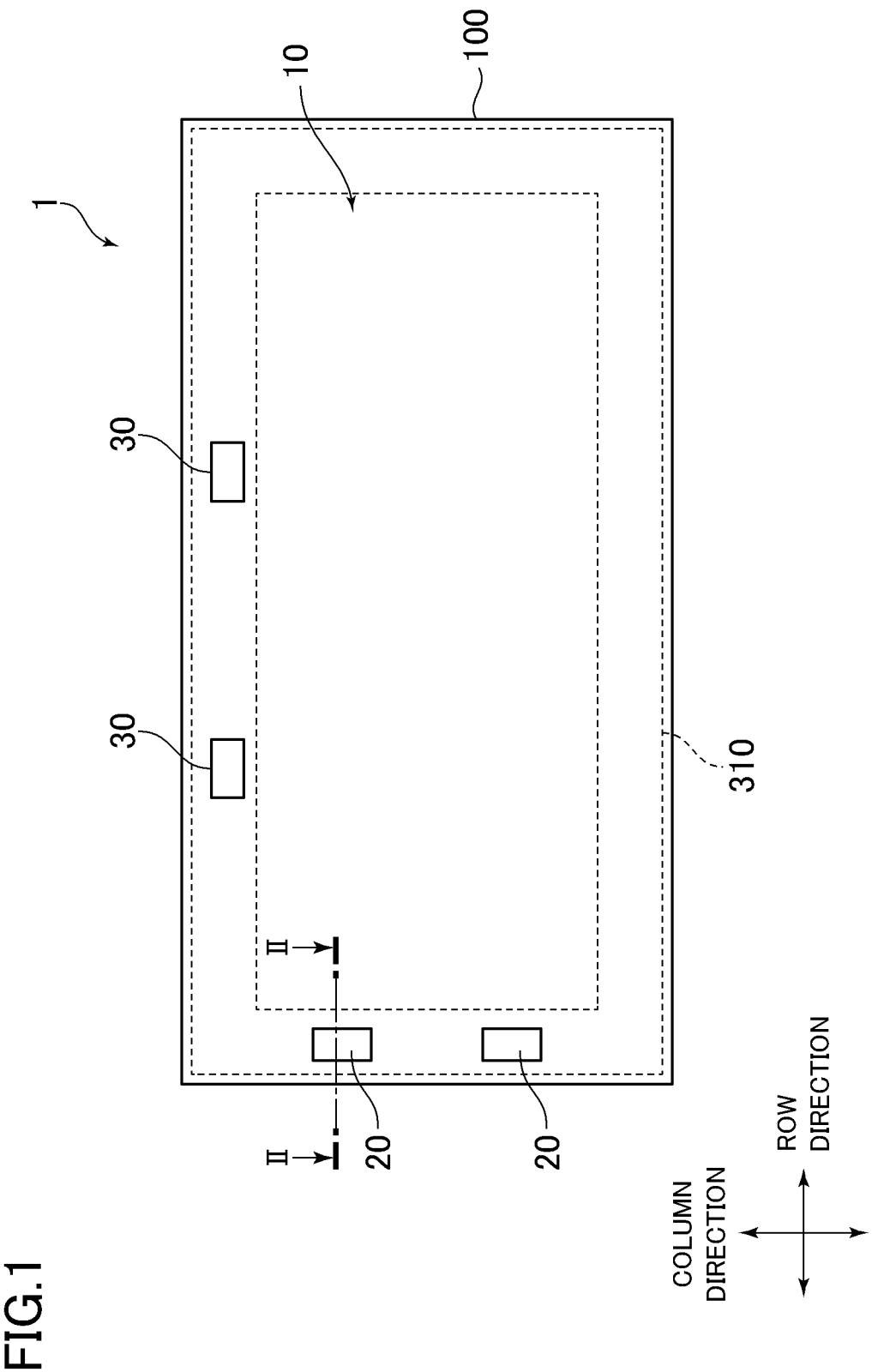
FIG. 1 is a schematic plan view illustrating a rear surface side of display device according to an exemplary embodiment.
Figure 2:
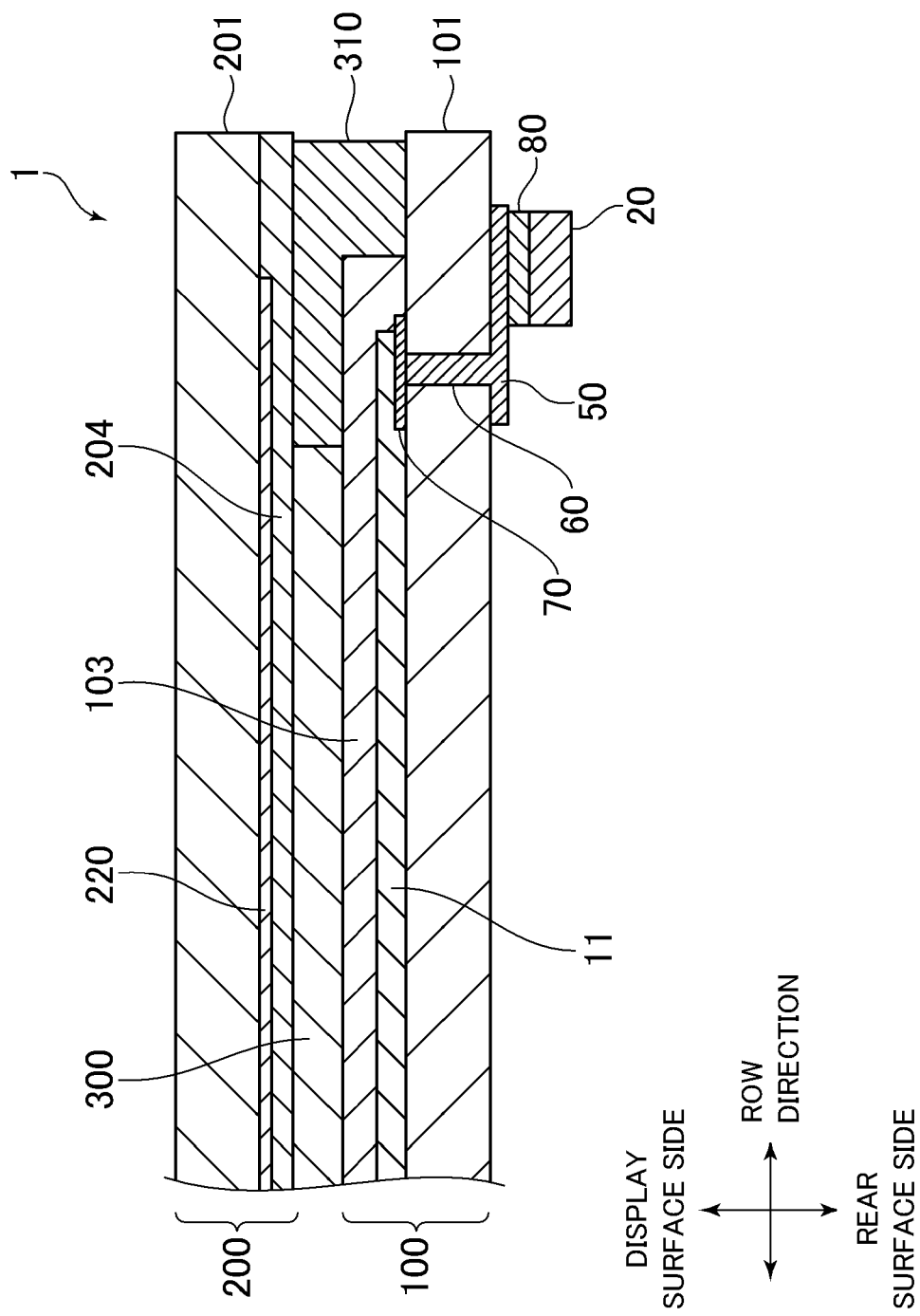
FIG. 2 is a schematic sectional view illustrating a sectional structure taken along line II-II in FIG. 1.

FIG. 1 is a schematic plan view illustrating a rear surface side of display device 1 of the exemplary embodiment, and FIG. 2 is a schematic sectional view illustrating a sectional structure taken along line II-II in FIG. 1.

Display device 1 includes display panel 10, a driver (for example, source driver IC 20, gate driver IC 30), a control circuit (not illustrated), and a backlight device (not illustrated). Display panel 10 includes thin film transistor substrate 100 including a thin film transistor array, counter substrate 200 opposed to thin film transistor substrate 100, and liquid crystal layer 300 disposed between thin film transistor substrate 100 and counter substrate 200. Seal member 310 surrounding an outer periphery of liquid crystal layer 300 is disposed between a first main surface (display surface side) of thin film transistor substrate 100 and a second main surface (rear surface side) of counter substrate 200, and thin film transistor substrate 100 and counter substrate 200 are bonded and fixed to each other by seal member 310. Liquid crystal layer 300 is disposed while being surrounded by thin film transistor substrate 100, counter substrate 200, and seal member 310, and the liquid crystal included in liquid crystal layer 300 is sealed in an inner peripheral side of seal member 310.

Display panel 10 roughly includes a display region where an image is displayed and a non-display region (frame region) around the display region. In the conventional configuration, it is necessary to provide a driver mounting region where source driver IC 20 and gate driver IC 30 as the driver is mounted in a region corresponding to the non-display region of thin film transistor substrate 100. On the other hand, in display device 1 of the exemplary embodiment, terminal 50 connected to the driver is disposed on the rear surface side of thin film transistor substrate 100. For this reason, it is unnecessary to separately provide the driver mounting region that protrudes from counter substrate 200 in planar view, and it is unnecessary to form thin film transistor substrate 100 larger than counter substrate 200. As a result, the frame of display device 1 can further be narrowed.

It is unnecessary to separately provide the driver mounting region that protrudes from counter substrate 200, so that thin film transistor substrate 100 and counter substrate 200 can be formed while being overlapped with each other in planar view even in an end side in which terminal 50 connected to the driver is formed. That is, an outer periphery of first glass substrate 101 included in thin film transistor substrate 100 and an outer periphery of second glass substrate 201 included in counter substrate 200 overlap with each other in planar view. For this reason, it is unnecessary to form first glass substrate 101 and second glass substrate 201 into different shapes, so that improvement of productivity can also be achieved.

Source driver IC 20 and gate driver IC 30 are directly mounted on first glass substrate 101 disposed on the rear surface side of thin film transistor substrate 100. That is, COG (Chip On Glass) system display device 1 is illustrated in FIG. 1. Source driver IC 20 and gate driver IC 30 are disposed along two different sides of display panel 10. In the present embodiment, two source driver ICs 20 and two gate driver ICs 30 are illustrated, but the number of source driver ICs 20 and the number of gate driver ICs 30 are not limited. Display device 1 of the present disclosure is not limited to the COG system, but may be FOG (Film On Glass) system display device 1. In the exemplary embodiment, by way of example, source driver IC 20 and gate driver IC 30 are disposed along two different sides of display panel 10. Alternatively, source driver IC 20 and gate driver IC 30 may be disposed side by side along one side.

In the exemplary embodiment, as illustrated in FIG. 2, source line 11 that is a wiring is formed on the first main surface (display surface side) of first glass substrate 101 included in thin film transistor substrate 100, and terminal 50 is formed on the second main surface (rear surface side). First glass substrate 101 includes through-hole 60. Source line 11 disposed in the first main surface (display surface side) of first glass substrate 101 and terminal 50 disposed in the second main surface (rear surface side) are electrically connected to each other through through-hole 60. More specifically, terminal 50 formed in the second main surface is formed up to an inside of through-hole 60, and connected to source line 11 in the first main surface (display surface side). With this configuration, terminal 50 connected to the driver (in the example of FIGS. 1 and 2, source driver IC 20) can be disposed on the rear surface side of thin film transistor substrate 100.

In the example of FIG. 2, source driver IC 20 disposed in the second main surface (rear surface side) of first glass substrate 101 and source line 11 disposed in the first main surface (display surface side) are electrically connected to each other through through-hole 60. Similarly, gate driver IC 30 and the gate line in FIG. 1 are electrically connected to each other through through-hole 60 provided in first glass substrate 101.

In the exemplary embodiment, as illustrated in FIG. 2, conductor film 70 is interposed between the first main surface (display surface side) of first glass substrate 101 and source line 11. Conductor film 70 overlaps with through-hole 60 in planar view, and is electrically connected to source line 11 and terminal 50. Conductor film 70 contains a material having an ionization tendency lower than that of a material contained in source line 11. Although described later in detail in a method for manufacturing a display device, in the case of including an etching step in forming through-hole 60, corrosion of source line 11 can be prevented in the etching step by interposing conductor film 70 made of the material having high etching resistance to an etching solution as compared with source line 11.

Preferably, an outer edge of seal member 310 used to bond first glass substrate 101 and second glass substrate 201 is disposed on the outer edge side of first glass substrate 101 with respect to through-hole 60 in planar view. With this configuration, in the etching step, the etching solution can be prevented from invading between first glass substrate 101 and second glass substrate 201 to corrode a connection portion between terminal 50 and source line 11 and conductor film 70.

In the exemplary embodiment, as illustrated in FIG. 2, conductive film 80 is disposed on the rear surface side of terminal 50, and source driver IC 20 is also disposed on the rear surface side of terminal 50. For example, conductive film 80 is an anisotropic conductive film. A conductive film in which conductive fine particles such as nickel and gold are dispersed in an insulating adhesive film can be used as conductive film 80. By pressing source driver IC 20 from the rear surface side of conductive film 80, the anisotropic conductive film is pressurized and the conductive fine particles contained in the adhesive film electrically connect source driver IC 20 and terminal 50.

When source driver IC 20 is pressed from the rear surface side of conductive film 80, stress is generated not only in conductive film 80 but also in first glass substrate 101. For this reason, as illustrated in FIG. 2, seal member 310 desirably overlaps with conductive film 80 in planar view. With this configuration, the stress applied to first glass substrate 101 can be absorbed by seal member 310, and first glass substrate 101 can be prevented from cracking.

Desirably, conductive film 80 does not overlap with through-hole 60 in planar view. There is a possibility that mechanical strength of the region where through-hole 60 is formed is weakened as compared with other regions. Consequently, when conductive film 80 and through-hole 60 are disposed so as not to overlap with each other in planar view, the stress generated in pressing source driver IC 20 can be prevented from being directly applied to the region where through-hole 60 is formed in transmitting the stress to first glass substrate 101 through conductive film 80, so that first glass substrate 101 can be prevented from cracking.

Desirably, seal member 310 overlaps with through-hole 60 in planar view. As described above, the region where through-hole 60 is formed has the mechanical strength lower than that of other regions. However, by making seal member 310 overlap with through-hole 60 in planar view, the stress applied to the region where through-hole 60 is formed can be absorbed by seal member 310 that overlaps with through-hole 60 in planar view. As a result, first glass substrate 101 can be prevented from cracking.

Figure 3:
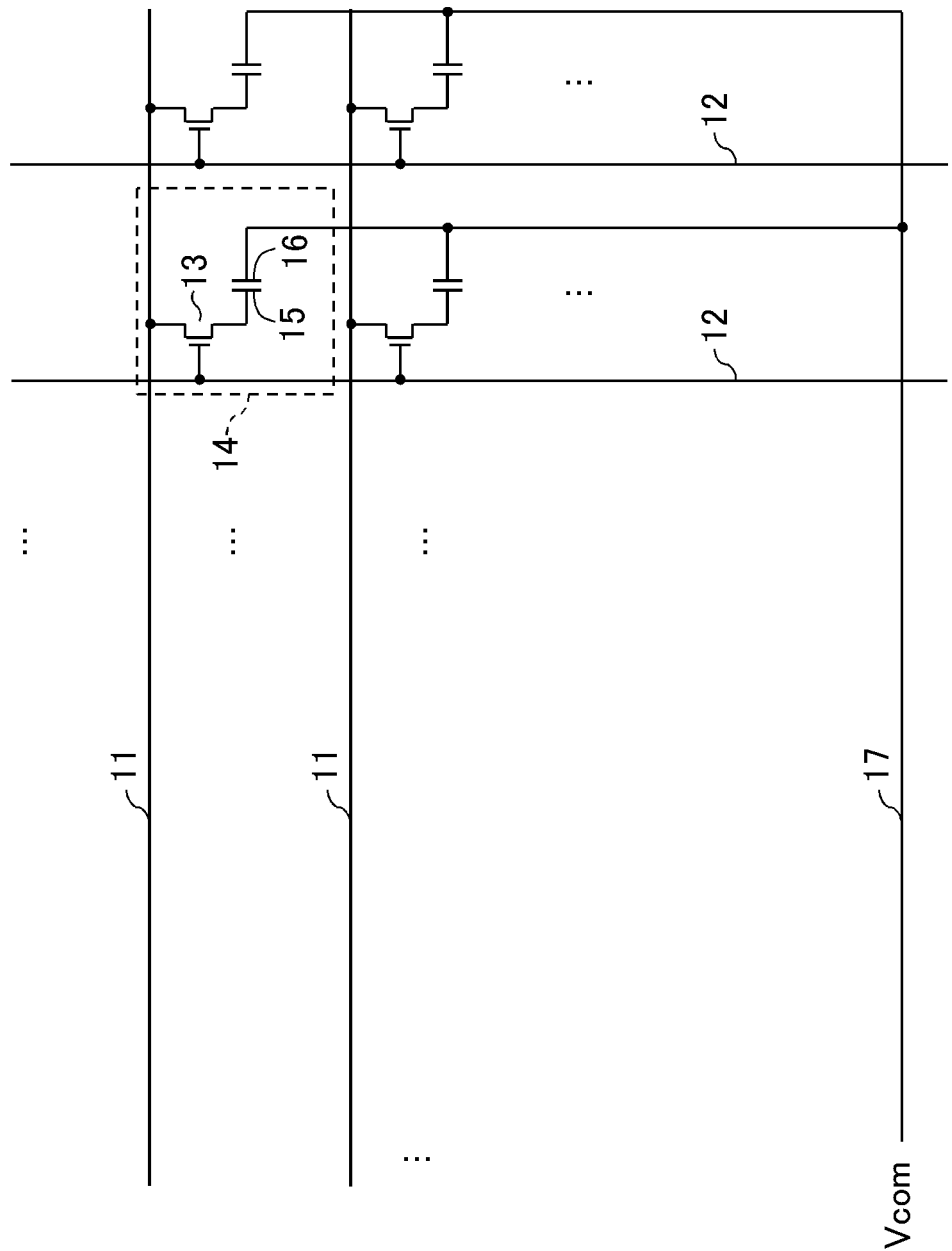
FIG. 3 is an equivalent circuit diagram illustrating a schematic configuration of the display region of display panel according to the exemplary embodiment.

FIG. 3 is an equivalent circuit diagram illustrating a schematic configuration of the display region of display panel 10. A plurality of source lines 11 extending in a first direction (for example, a row direction) and a plurality of gate lines 12 extending in a second direction (for example, a column direction) are provided in display panel 10. Thin film transistor (TFT) 13 is provided in an intersection of each source line 11 and each gate line 12. Each source line 11 is electrically connected to corresponding source driver IC 20 (see FIG. 1), and each gate line 12 is electrically connected to corresponding gate driver IC 30 (see FIG. 1).

In display panel 10, a plurality of pixels 14 are arranged into a matrix shape (the row direction and the column direction) corresponding to the intersections of source lines 11 and gate lines 12. A plurality of pixel electrodes 15 disposed in each pixel 14 and common electrode 16 common to the plurality of pixels 14 are provided in thin film transistor substrate 100.

A data signal (data voltage) is supplied from corresponding source driver IC 20 to each source line 11. A gate signal (gate-on voltage, gate-off voltage) is supplied from corresponding gate driver IC 30 to each gate line 12. Common voltage Vcom is supplied from a common driver (not illustrated) to common electrode 16 through common line 17. When an on voltage (gate-on voltage) of the gate signal is supplied to gate line 12, TFT 13 connected to gate line 12 is turned on, and the data voltage is supplied to pixel electrode 15 through source line 11 connected to TFT 13. An electric field is generated by a difference between the data voltage supplied to pixel electrode 15 and common voltage Vcom supplied to common electrode 16. Liquid crystal is driven by the electric field to control transmittance of light emitted from the backlight, thereby displaying an image. For performing color display, a desired data voltage is supplied to source line 11 connected to pixel electrode 15 of pixel 14 corresponding to each of red, green, and blue, which are formed by a stripe color filter.

Figure 4:
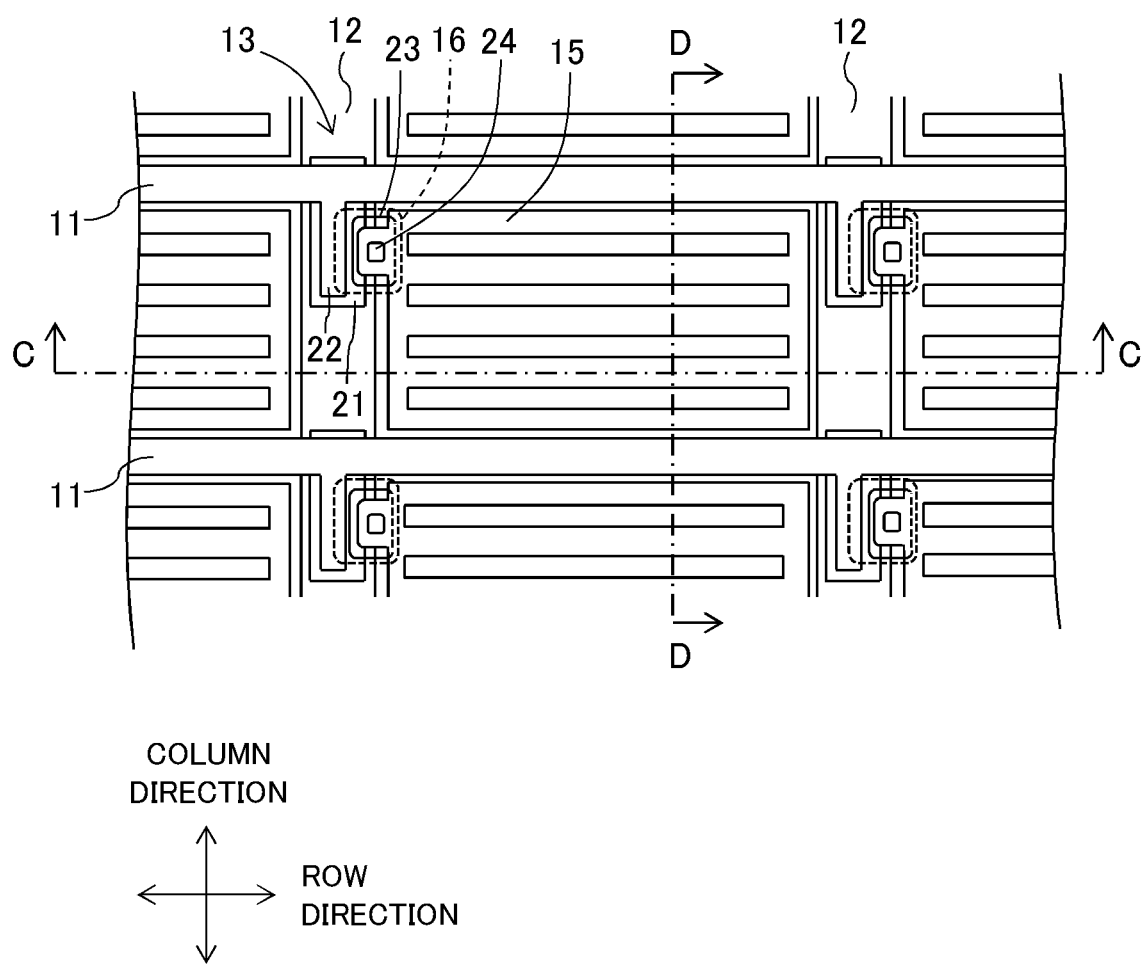
FIG. 4 is a schematic plan view illustrating a configuration of pixels of display panel according to the exemplary embodiment.
Figure 5:
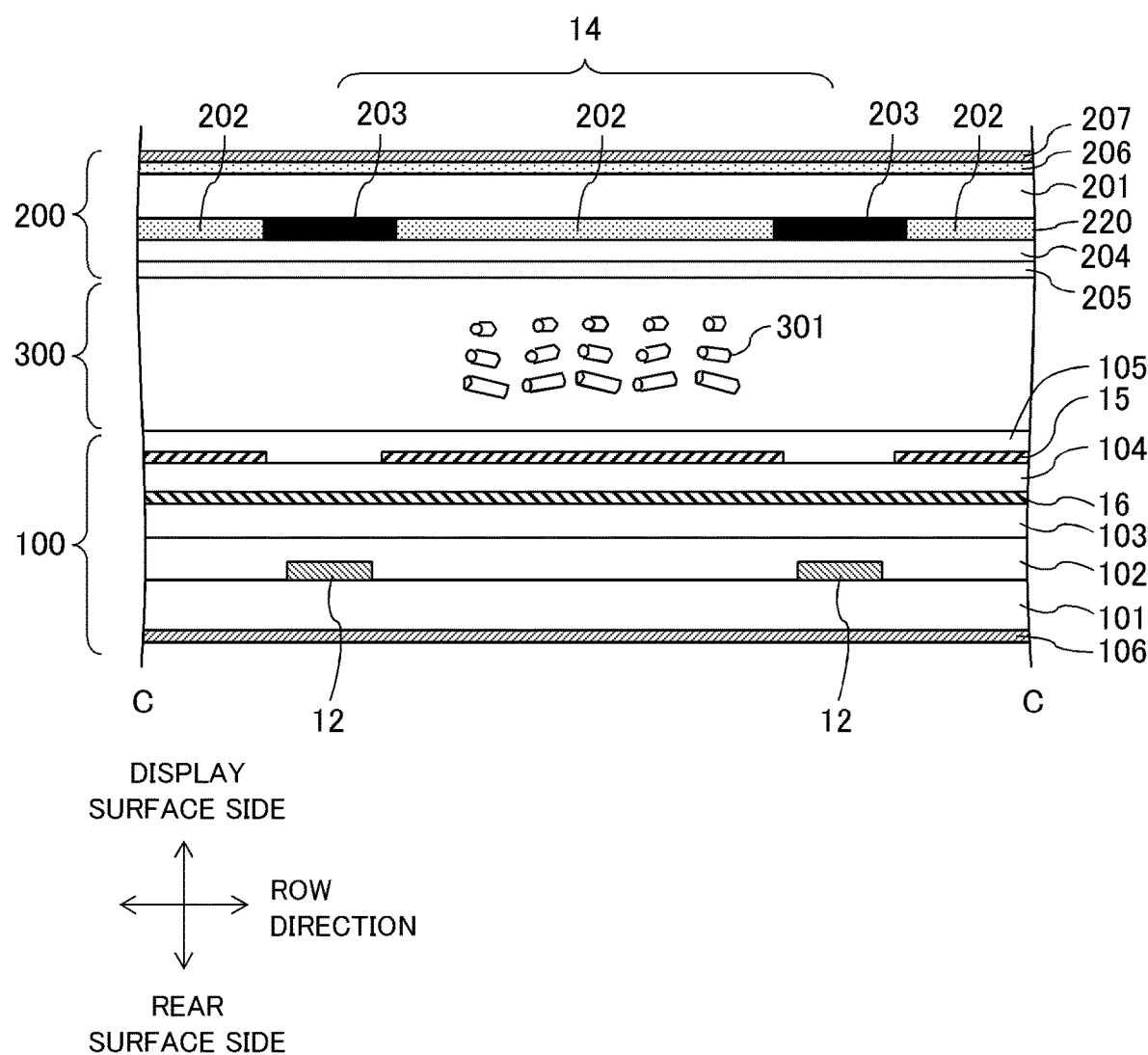
FIG. 5 is a sectional view taken along line C-C in FIG. 4.

FIG. 4 is a plan view illustrating a specific configuration of pixels 14 of display panel 10. FIG. 5 is a sectional view taken along line C-C in FIG. 4, and FIG. 6 is a sectional view taken along line D-D in FIG. 4. The specific configuration of pixel 14 will be described with reference to FIGS. 4 to 6.

In FIG. 4, a region that is partitioned by two adjacent source lines 11 and two adjacent gate lines 12 in planar view of display panel 10 corresponds to one pixel 14. TFT 13 is provided in each pixel 14. TFT 13 includes semiconductor layer 21 formed on insulating film 102 (see FIGS. 5 and 6) and drain electrode 22 and source electrode 23 that are formed on semiconductor layer 21. Drain electrode 22 is electrically connected to source line 11, and source electrode 23 is electrically connected to pixel electrode 15 through through-hole 24.

Pixel electrode 15 made of a transparent conductive material such as indium tin oxide (ITO) is formed in each pixel 14. Pixel electrode 15 includes a plurality of openings (slits), and is formed into a stripe shape. There is no limitation on a shape of the opening. One common electrode 16 made of the transparent conductive film such as ITO is formed in common to each pixel 14 over a display region. An opening (corresponding to a dotted-line enclosure in FIG. 4) is formed in a region where common electrode 16 overlaps with through-hole 24 and source electrode 23 of TFT 13 in order to electrically connect pixel electrode 15 and source electrode 23.

As illustrated in FIGS. 5 and 6, display panel 10 includes thin film transistor substrate 100, counter substrate 200, and liquid crystal layer 300 sandwiched between thin film transistor substrate 100 and counter substrate 200.

In thin film transistor substrate 100, gate line 12 (see FIG. 5) is formed on glass substrate 101, and insulating film 102 is formed so as to cover gate line 12. Source line 11 (see FIG. 6) is formed on insulating film 102, and insulating film 103 is formed so as to cover source line 11. Common electrode 16 is formed on insulating film 103, and insulating film 104 is formed so as to cover common electrode 16. Pixel electrode 15 is formed on insulating film 104, and alignment film 105 is formed so as to cover pixel electrode 15. Polarizing plate 106 is provided on the rear surface side of glass substrate 101.

In counter substrate 200, color filter layer 220 including black matrix 203 and colored portion 202 (for example, a red portion, a green portion, and a blue portion) is formed on glass substrate 201, and overcoat layer 204 is formed so as to cover black matrix 203 and colored portion 202. Alignment film 205 is formed on overcoat layer 204. Conductive layer 206 is provided on the surface (front surface) of glass substrate 201 on the display surface side (the side opposite to the liquid crystal layer 300 side), and polarizing plate 207 is provided on the surface (front surface) of conductive layer 206 on the display surface side (the side opposite to the liquid crystal layer 300 side).

Liquid crystal 301 is enclosed in liquid crystal layer 300. Liquid crystal 301 may be negative type liquid crystal having negative dielectric anisotropy or positive type liquid crystal having positive dielectric anisotropy. Alignment films 105, 205 may be an alignment film subjected to rubbing alignment treatment, or an optical alignment film subjected to optical alignment treatment.

[Method for Manufacturing Display Device]

A method for manufacturing display device 1 of the present disclosure will be described below. The method for manufacturing display device 1 of the present disclosure includes wiring forming step S2, through-hole forming step S4, and terminal forming step S6. In the exemplary embodiment, the method for manufacturing display device 1 further includes conductor film forming step S1, bonding step S3, segmentation step S5, and pressure bonding step S7.

Figure 7:
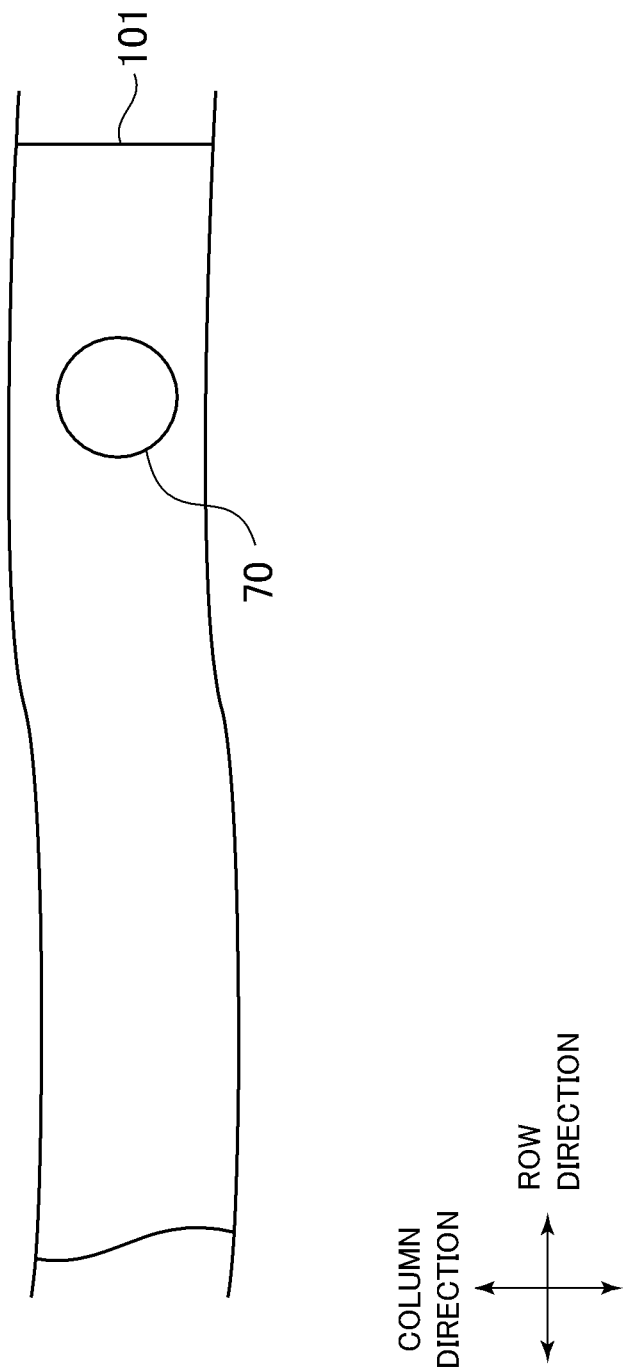
FIG. 7 is a schematic plan view illustrating the method for manufacturing a display device according to the exemplary embodiment.
Figure 8:
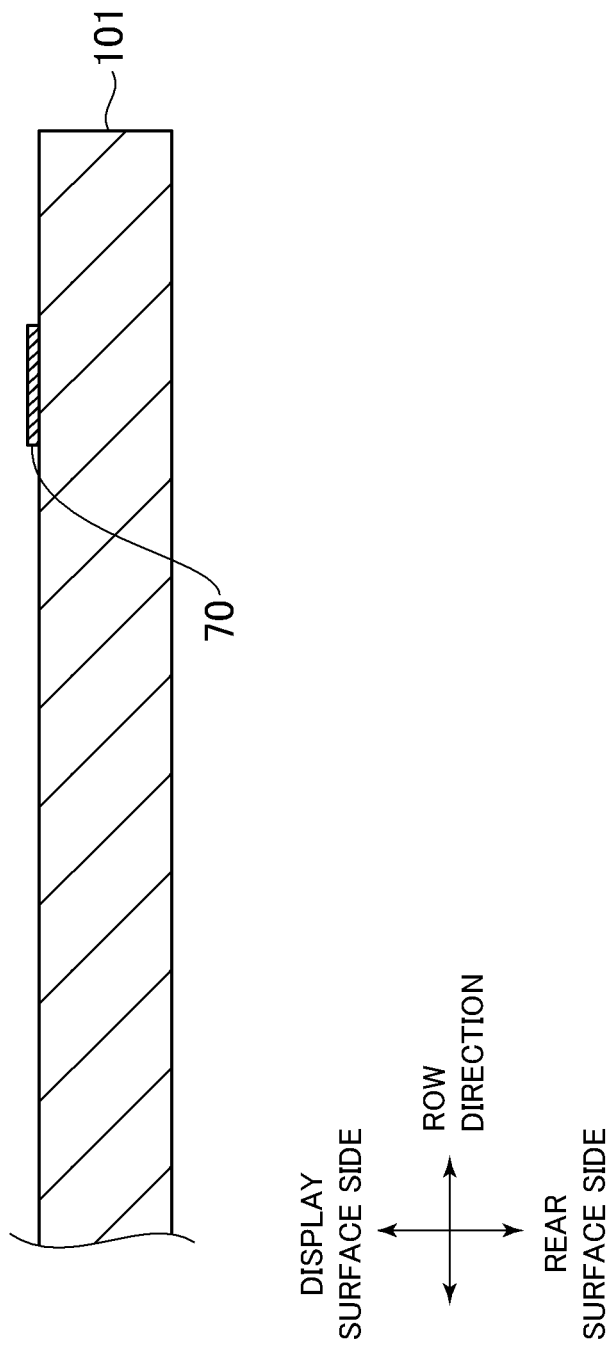
FIG. 8 is a schematic sectional view illustrating the method for manufacturing a display device according to the exemplary embodiment.
Figure 9:
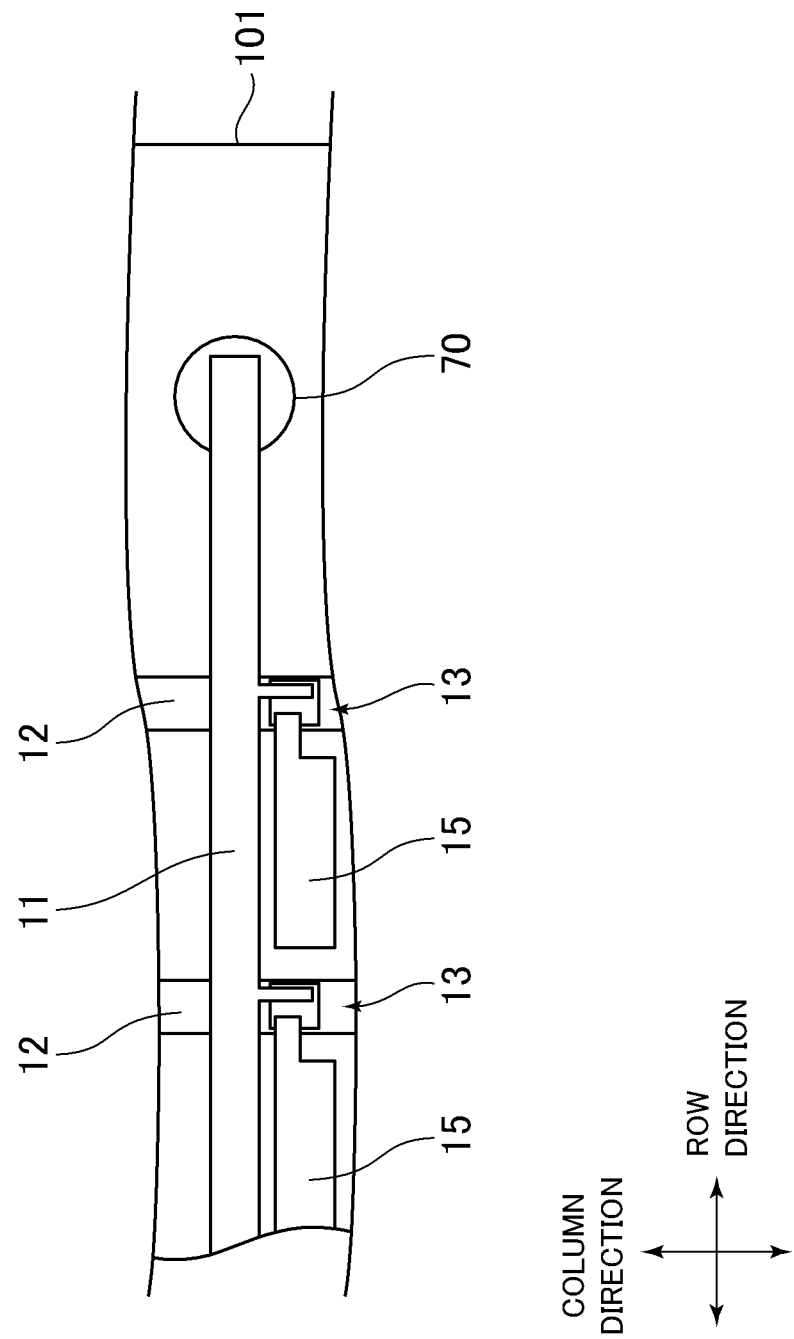
FIG. 9 is a schematic plan view illustrating the method for manufacturing a display device according to the exemplary embodiment.
Figure 10:
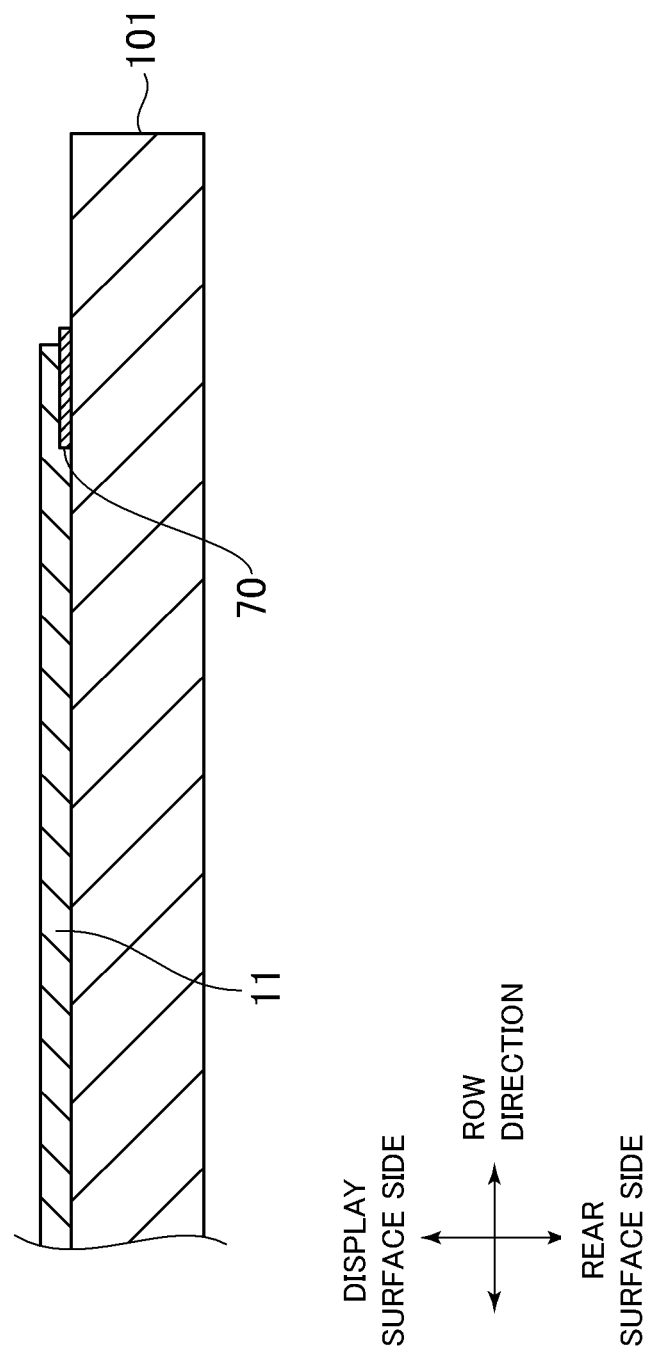
FIG. 10 is a schematic sectional view illustrating the method for manufacturing a display device according to the exemplary embodiment.
Figure 11:
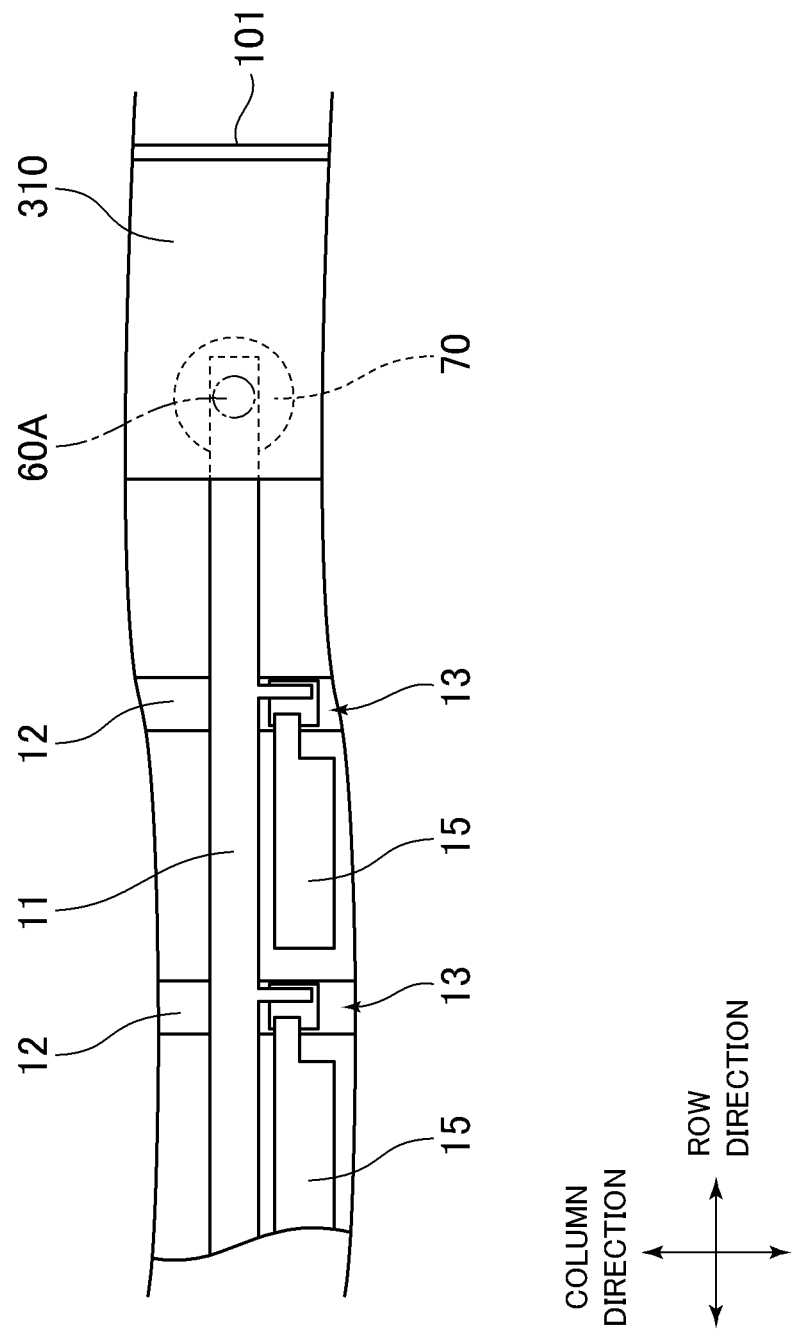
FIG. 11 is a schematic plan view illustrating the method for manufacturing a display device according to the exemplary embodiment.

FIGS. 7, 9, and 11 are schematic plan views illustrating the method for manufacturing a display device of the exemplary embodiment, and illustrating the rear surface side of the second glass substrate. FIGS. 8, 10, and 12 to 19 are schematic sectional views illustrating the method for manufacturing a display device of the exemplary embodiment, and illustrating a section corresponding to line II-II in FIG. 1.

In the exemplary embodiment, conductor film forming step S1 is performed. In conductor film forming step S1, as illustrated in FIGS. 7 and 8, conductor film 70 is formed in the first main surface (display surface side) of first glass substrate 101. Desirably, a material, such as gold and platinum, which has an ionization tendency lower than that of source line 11 or gate line 12, is used as a material constituting conductor film 70.

Subsequently, wiring forming step S2 is performed. In wiring forming step S2, as illustrated in FIGS. 9 and 10, the wiring is formed in the first main surface (display surface side) of first glass substrate 101. The wiring includes source line 11 and gate line 12, and source line 11 is electrically connected to conductor film 70 in FIG. 9. Source line 11 and gate line 12 are electrically connected to pixel electrode 15 through TFT 13.

Figure 12:
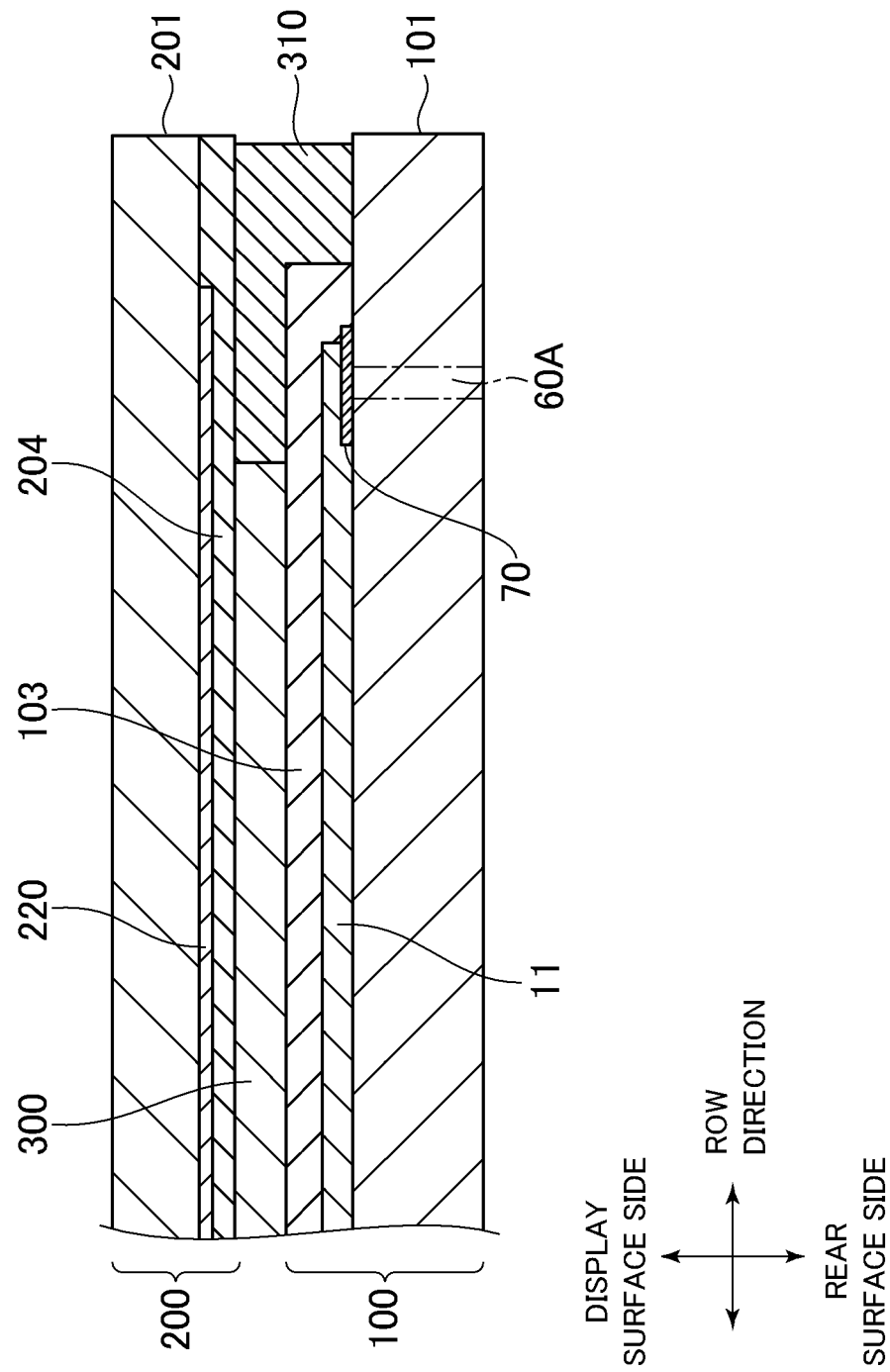
FIG. 12 is a schematic sectional view illustrating the method for manufacturing a display device according to the exemplary embodiment.

Then, bonding step S3 is performed. In bonding step S3, as illustrated in FIGS. 11 and 12, first glass substrate 101 and second glass substrate 201 are bonded together using seal member 310. Desirably, counter substrate 200 including second glass substrate 201 is prepared in advance of bonding step S3. As illustrated in FIG. 12, insulating film 103 may be interposed between seal member 310 and first glass substrate 101, and color filter layer 220 and overcoat layer 204 may be interposed between seal member 310 and second glass substrate 201.

In bonding step S3, seal member 310 is disposed such that position 60A where through-hole 60 is formed in through-hole forming step S4 (to be described later) and seal member 310 overlap with each other in planar view. At least a part of the outer edge of seal member 310 is disposed so as to be located on the outer edge side of first glass substrate 101 with respect to position 60A where through-hole 60 is formed in planar view.

A liquid crystal layer forming step of forming liquid crystal layer 300 may be further included before or after bonding step S3. As a first example, after seal member 310 is formed on the display surface side of thin film transistor substrate 100 in bonding step S3, liquid crystal is dropped on an inner peripheral side of seal member 310, thin film transistor substrate 100 and counter substrate 200 are bonded together (S3), and seal member 310 is cured by irradiation of an ultraviolet ray. In a second example, after seal member 310 is formed on the rear surface side of counter substrate 200, liquid crystals are dropped on the inner peripheral side of seal member 310, thin film transistor substrate 100 and counter substrate 200 are bonded together (S3), and seal member 310 is cured by the irradiation of the ultraviolet ray. As a third example, thin film transistor substrate 100 and counter substrate 200 are bonded together (S3), and the liquid crystal is injected into the region surrounded by seal member 310. Thus, the order of performing the liquid crystal layer forming step and the bonding step S3 is not considered.

Figure 13:
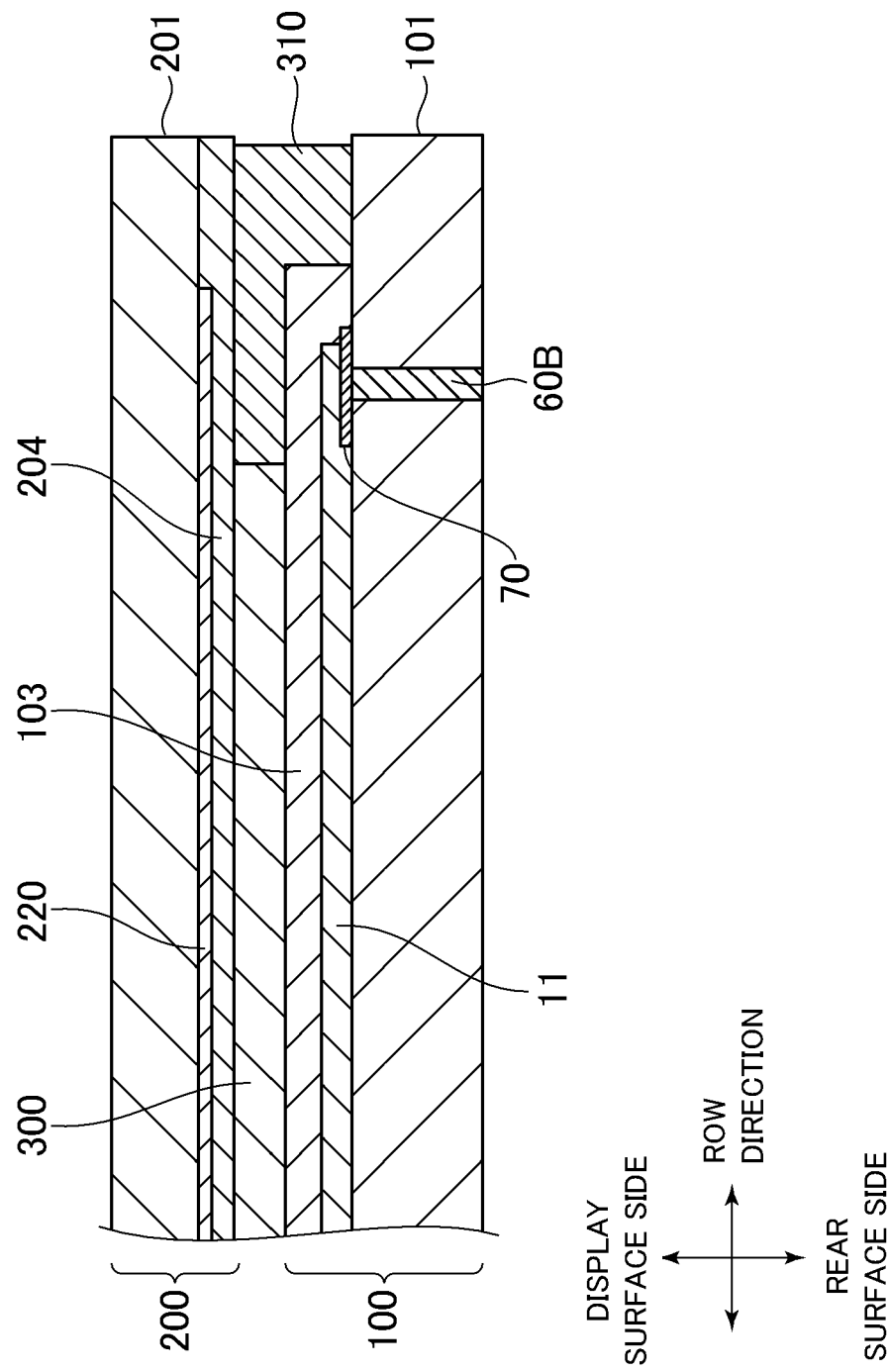
FIG. 13 is a schematic sectional view illustrating the method for manufacturing a display device according to the exemplary embodiment.
Figure 14:
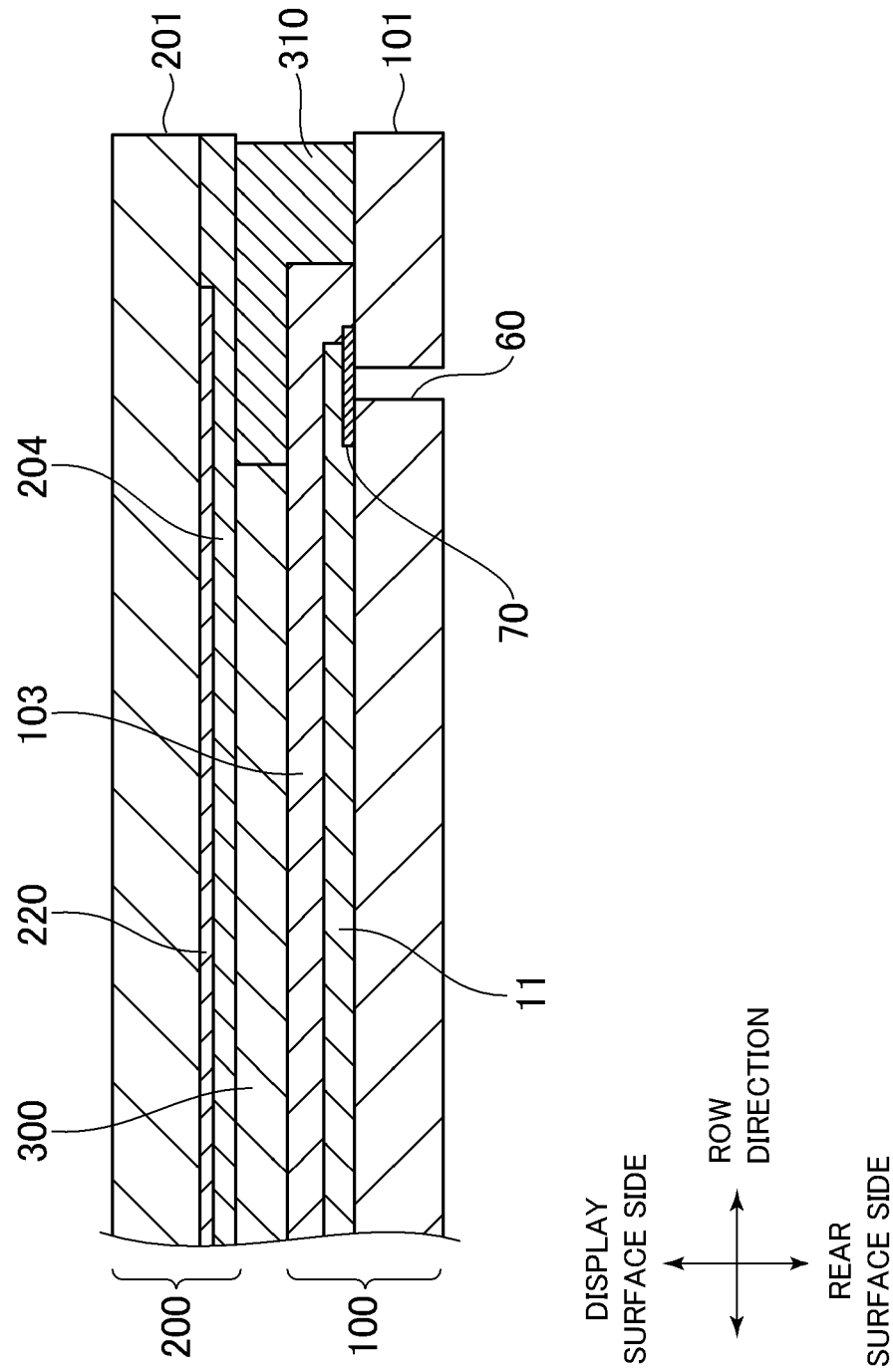
FIG. 14 is a schematic sectional view illustrating the method for manufacturing a display device according to the exemplary embodiment.

Subsequently, through-hole forming step S4 is performed. In the exemplary embodiment, through-hole forming step S4 includes a laser irradiation step and a wet etching step. In the laser irradiation step, as illustrated in FIG. 13, first glass substrate 101 is irradiated with a laser beam to form modified region 60B. In the wet etching process, first glass substrate 101 is immersed in an acid or alkaline etching solution. Modified region 60B formed by the irradiation of the laser beam has an etching rate faster than that of other portions. For this reason, modified region 60B is etched deeper than other portions by the etching solution, and through-hole 60 is formed as illustrated in FIG. 14. In the wet etching step, first glass substrate 101 can simultaneously be thinned.

In the exemplary embodiment, as illustrated in FIG. 14, in through-hole forming step S4, through-hole 60 is formed so as to overlap with conductor film 70 in planar view. As described above in conductor film forming step S1, the material, such as gold and platinum, which has the ionization tendency lower than that of copper or aluminum that is mainly contained in source line 11 or gate line 12, is used as the material constituting conductor film 70. For this reason, conductor film 70 has high etching resistance to an etching solution, such as hydrofluoric acid, sulfuric acid, and nitric acid, which is used in the wet etching step, as compared with source line 11 and gate line 12. Thus, when through-hole 60 is formed so as to overlap with conductor film 70 in planar view, source line 11 and gate line 12 can be prevented from being corroded by the etching solution.

As described above, in bonding step S3, seal member 310 is disposed so as to overlap with position 60A (see FIG. 12) where through-hole 60 is formed in planar view. For this reason, in through-hole forming step S4, through-hole 60 is formed so as to overlap with seal member 310 in planar view.

As described above, in bonding step S3, seal member 310 is disposed such that at least a part of the outer edge of seal member 310 is located on the outer edge side of first glass substrate 101 with respect to position 60A (see FIG. 12) where through-hole 60 is formed in planar view. For this reason, in through-hole forming step S4, at least the part of the outer edge of seal member 310 is disposed on the outer edge side with respect to through-hole 60. As a result, in the wet etching step, the etching solution can be prevented from invading between first glass substrate 101 and second glass substrate 201 to corrode a connection portion between terminal 50 and source line 11 and conductor film 70.

Figure 15:
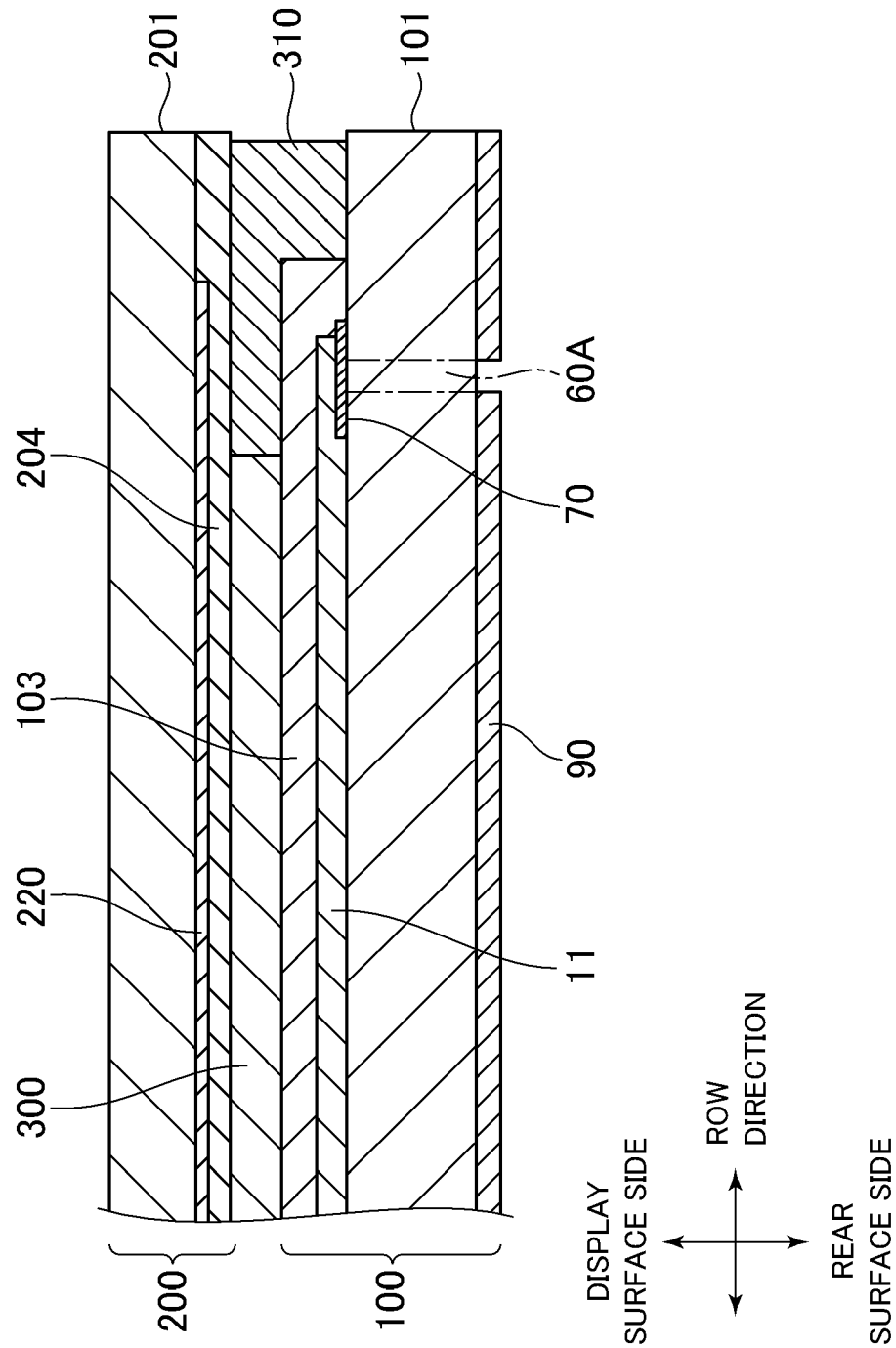
FIG. 15 is a schematic sectional view illustrating the method for manufacturing a display device according to the exemplary embodiment.

In the exemplary embodiment, through-hole forming step S4 includes the laser irradiation step and the wet etching step. Alternatively, as illustrated in FIG. 15, on the rear surface side of first glass substrate 101, resist 90 may be formed by photolithography while avoiding position 60A where through-hole 60 is formed, the wet etching may be performed to form through-hole 60, and resist 90 may be peeled off. However, in the case where thin film transistor substrate 100 is a large-size substrate including a plurality of display panel regions, it is necessary to have a thickness ensuring the mechanical strength enough to withstand the stress during conveyance up to segmentation step S5 (to be described later). For this reason, sometimes a step of thinning first glass substrate 101 is provided in order to thin display device 1 after segmentation step S5. As to the demand for the thinning, when through-hole forming step S4 includes the laser irradiation step and the wet etching step, first glass substrate 101 can simultaneously be thinned in the wet etching step, so that desirably the productivity is high.

When through-hole forming step S4 includes the laser irradiation step and the wet etching step, segmentation step S5 and through-hole forming step S4 can be performed in the same step.

Figure 16:
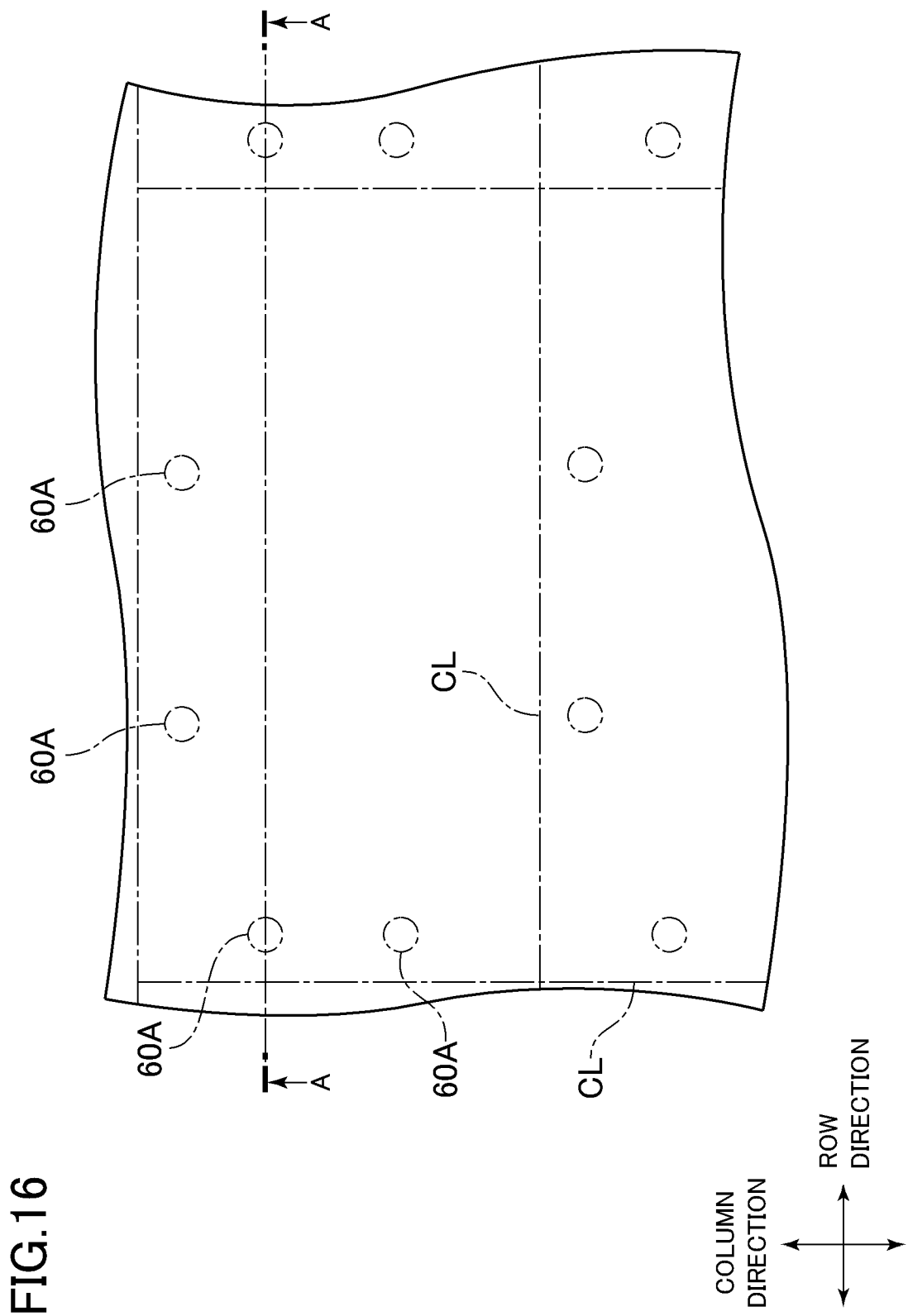
FIG. 16 is a schematic plan view illustrating the method for manufacturing a display device according to the exemplary embodiment.
Figure 17:
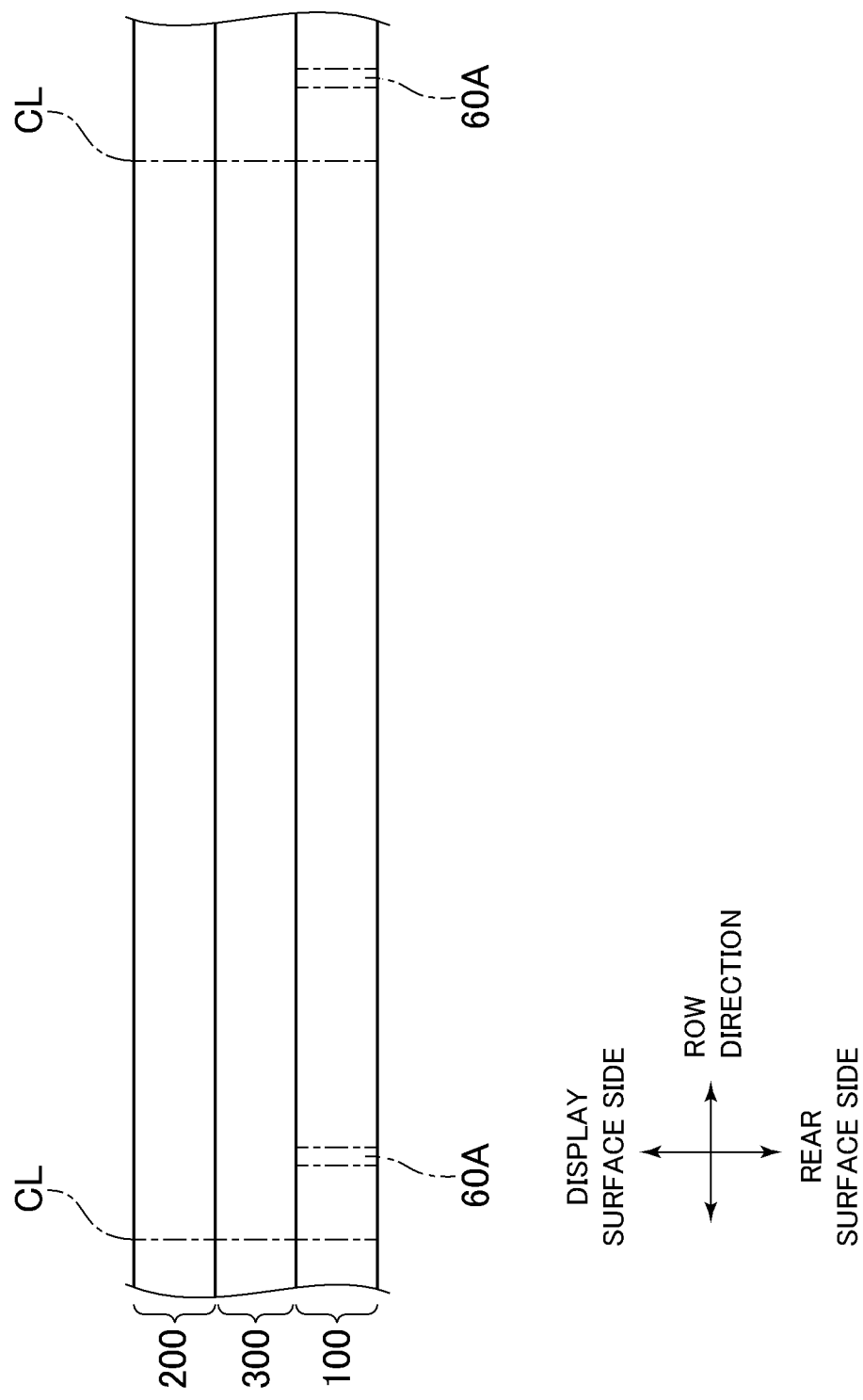
FIG. 17 is a sectional view taken along line A-A in FIG. 16.

That is, as illustrated in FIGS. 16 and 17, segmentation step S5 includes a step of irradiating large-size thin film transistor substrate 100 and counter substrate 200 with the laser beam along outer edge CL of the plurality of display panel regions and a step of immersing thin film transistor substrate 100 and counter substrate 200 in the etching solution to perform the wet etching along the plurality of display panel regions. Thus, in the laser irradiation step (the laser irradiation along outer edge CL in FIGS. 16 and 17) in segmentation step S5 and the laser irradiation step (the laser irradiation along position 60A where the through-holes is formed in FIGS. 16 and 17) in through-hole forming step S4 are performed in the same step, and the wet etching step in segmentation step S5 and the wet etching step in through-hole forming step S4 are performed in the same step, which allows the improvement of the productivity.

In segmentation step S5, thin film transistor substrate 100 and counter substrate 200 can be formed into the same shape. That is, also on the end side in which terminal 50 is formed, the end sides of first glass substrate 101 and second glass substrate 201 can be formed such that first glass substrate 101 and second glass substrate 201 overlap with each other in planar view. As a result, it is unnecessary to form the two glass substrates into different shapes, and production efficiency can further be improved.

Figure 18:
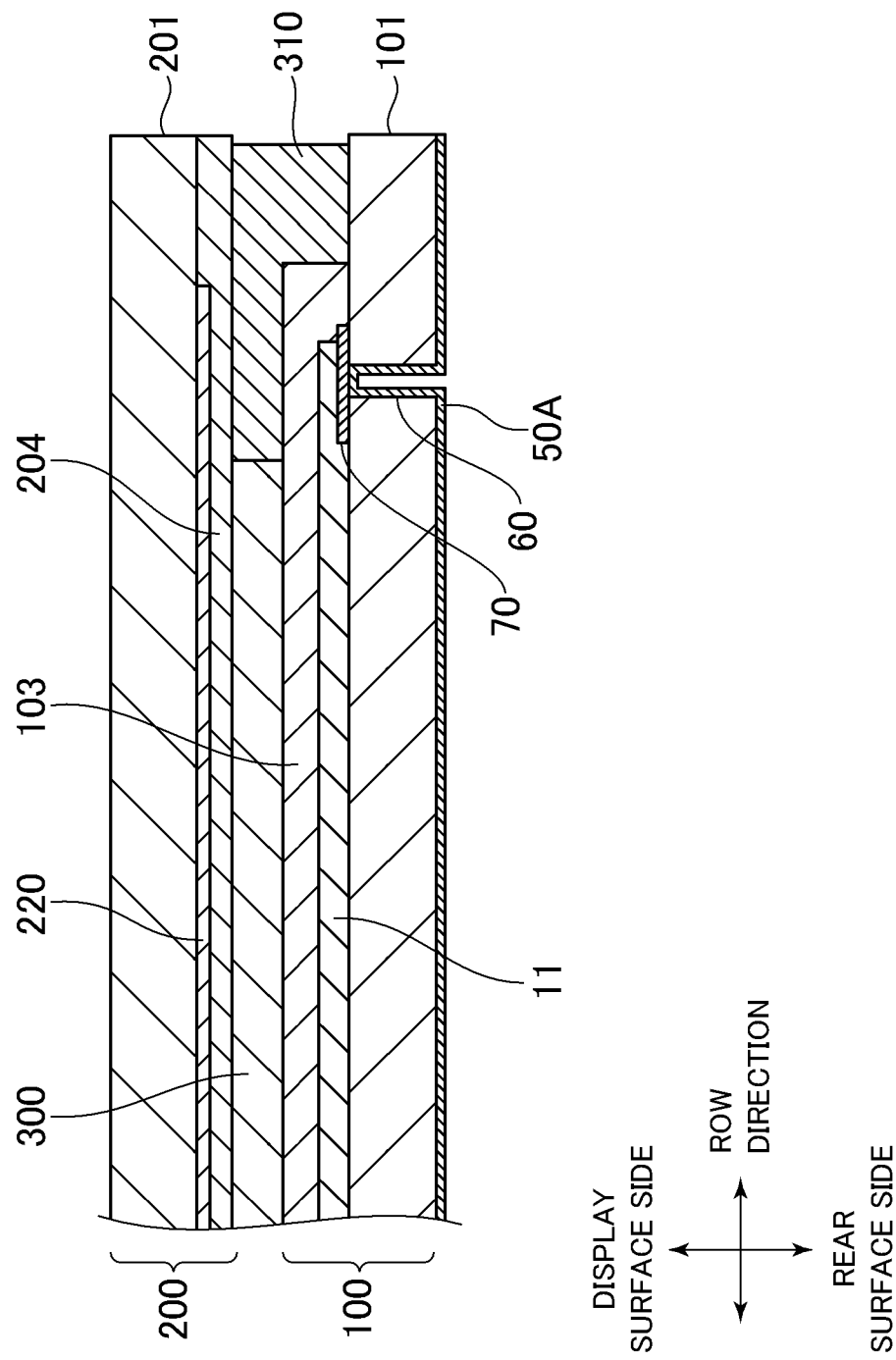
FIG. 18 is a schematic sectional view illustrating the method for manufacturing a display device according to the exemplary embodiment.

Subsequently, terminal forming step S6 is performed. In terminal forming step S6, as illustrated in FIG. 18, underlying conductive film 50A is formed on the second main surface (rear surface side) of first glass substrate 101 in which through-hole 60 is formed. For example, sputtering or electroless plating method can be used as a method for forming underlying conductive film 50A. Underlying conductive film 50A is formed not only on the rear surface side of first glass substrate 101 but also on the inner surface of through-hole 60 and a part of conductor film 70 exposed from through-hole 60.

Figure 19:
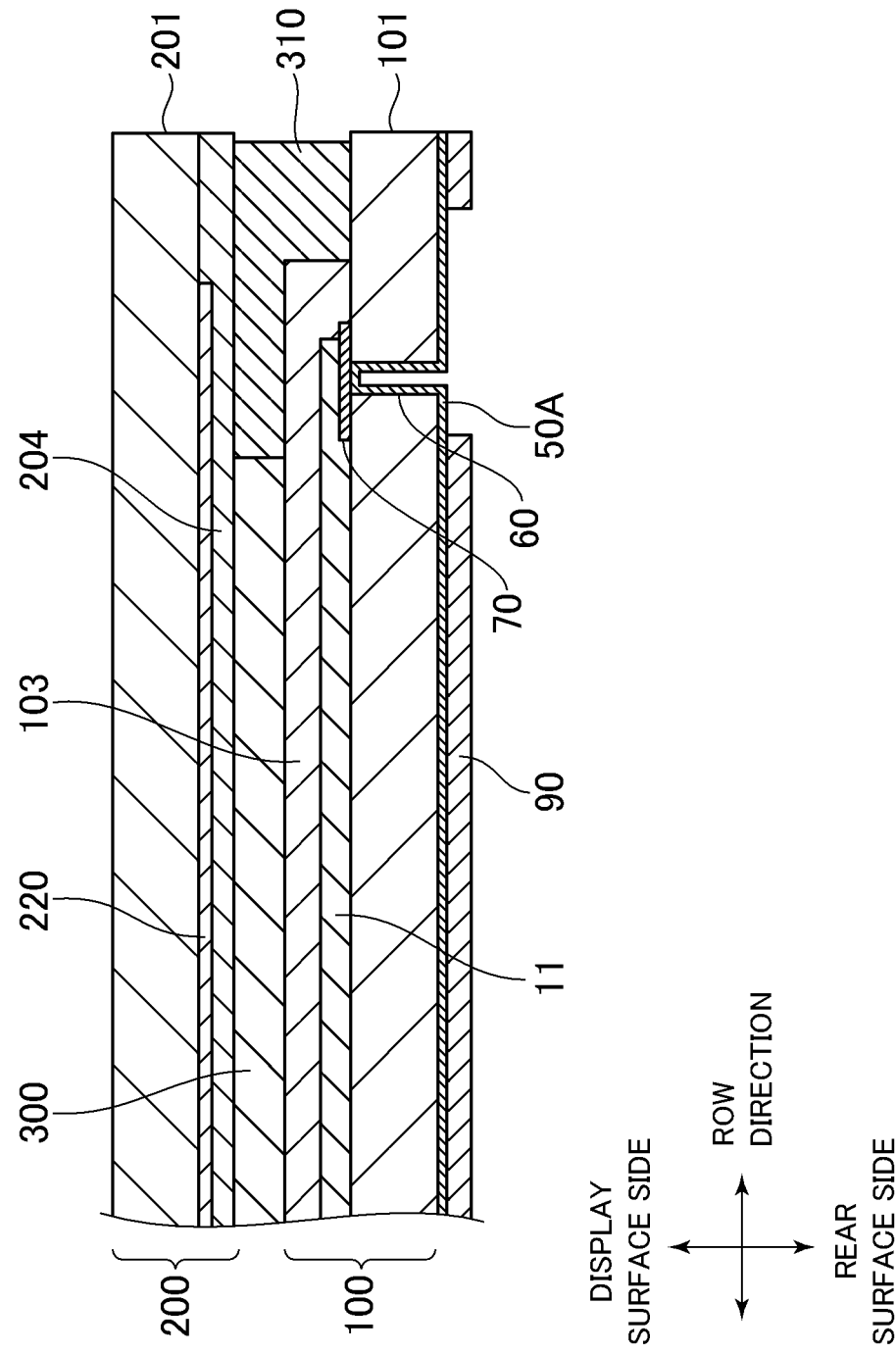
FIG. 19 is a schematic sectional view illustrating the method for manufacturing a display device according to the exemplary embodiment.
Figure 20:
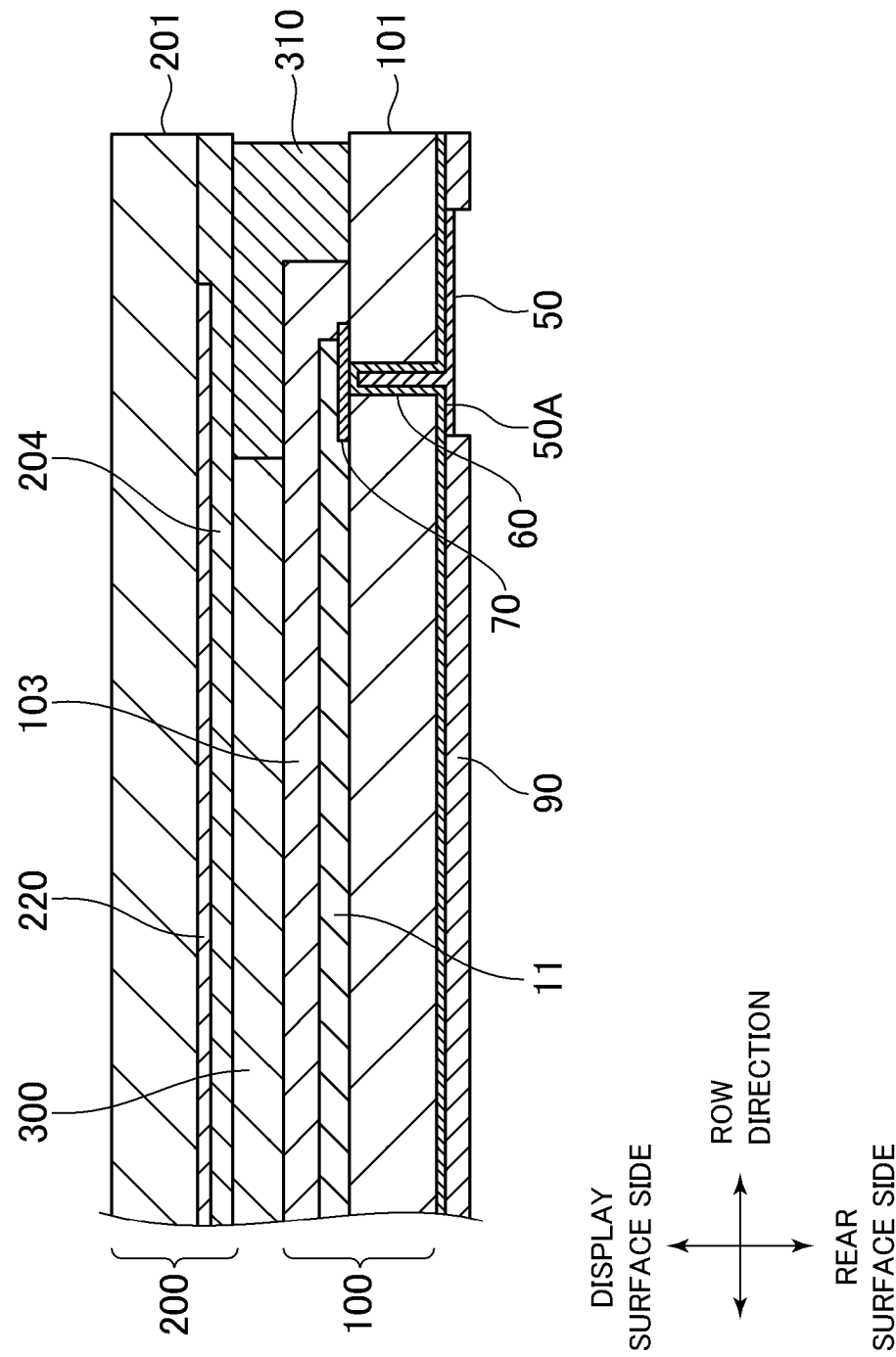
FIG. 20 is a schematic sectional view illustrating the method for manufacturing a display device according to the exemplary embodiment.

As illustrated in FIG. 19, resist 90 is formed by photolithography while avoiding the position where terminal 50 is formed. As illustrated in FIG. 20, electric field plating is performed while electricity is supplied to underlying conductive film 50A, which allows the formation of terminal 50. In this way, terminal 50 electrically connected to the wiring such as source line 11 through through-hole 60 can be formed in the second main surface (rear surface side) of first glass substrate 101. In the exemplary embodiment, terminal 50 is electrically connected to the wiring such as source line 11 through conductor film 70.

Resist 90 is removed using acetone after terminal 50 is formed. Then, a portion in which the rear surface side of underlying conductive film 50A is not covered with terminal 50 is removed by the wet etching.

In the example of FIG. 19, resist 90 is formed while avoiding the position where terminal 50 is formed. Alternatively, as illustrated in FIG. 21, resist 90 may be formed at the position where terminal 50 is formed. After resist 90 is formed at the position where terminal 50 is formed, the portion in which the rear surface side of underlying conductive film 50A is not covered with resist 90 is removed by the wet etching. Then, by removing resist 90 using acetone, remaining underlying conductive film 50A may be used as terminal 50.

Pressure bonding step S7 is performed after terminal forming step S6. In pressure bonding step S7, as illustrated in FIG. 2, conductive film 80 is pressure-bonded from the rear surface side to terminal 50 on the second main surface (rear surface side) of first glass substrate 101. For example, conductive film 80 is an anisotropic conductive film. A conductive film in which conductive fine particles such as nickel and gold are dispersed in an insulating adhesive film can be used as conductive film 80. By pressing source driver IC 20 from the rear surface side of conductive film 80, the anisotropic conductive film is pressurized and the conductive fine particles contained in the adhesive film electrically connect source driver IC 20 and terminal 50.

When source driver IC 20 is pressed from the rear surface side of conductive film 80, stress is generated not only in conductive film 80 but also in first glass substrate 101. For this reason, as illustrated in FIG. 2, conductive film 80 is desirably pressure-bonded to terminal 50 at the position overlapping with seal member 310 in planar view. By this method, the stress applied to first glass substrate 101 can be absorbed by seal member 310, and first glass substrate 101 can be prevented from cracking.

In pressure bonding step S7, conductive film 80 is desirably pressure-bonded to terminal 50 at the position that does not overlap with through-hole 60 in planar view. There is a possibility that mechanical strength of the region where through-hole 60 is formed is weakened as compared with other regions. Consequently, when conductive film 80 is press-bonded while avoiding the region where through-hole 60 is formed, the stress generated in pressure bonding step S7 can be prevented from being directly applied to the region where through-hole 60 is formed in transmitting the stress to first glass substrate 101 through conductive film 80. As a result, first glass substrate 101 can be prevented from cracking.

As described above in bonding step S3 and through-hole forming step S4, in the exemplary embodiment, through-hole 60 is formed so as to overlap with seal member 310 in planar view. For this reason, in pressure bonding step S7, the region where through-hole 60 in which the mechanical strength is weaker than that of other regions is formed overlaps with seal member 310 in planar view. As a result, the stress applied to the region where through-hole 60 is formed can be absorbed by seal member 310. As a result, first glass substrate 101 can be prevented from cracking.

However, as described in the exemplary embodiment, there is an advantage that the position where through-hole 60 is formed can easily be controlled by performing conductor film forming step S1 before through-hole forming step S4. That is, in the case where the laser irradiation step is performed in through-hole forming step S4 (see FIG. 13), through-hole 60 can be formed at an appropriate position by irradiating conductor film 70 formed in conductor film forming step S1 with the laser beam as a mark. In the case where resist 90 is formed by photolithography in through-hole forming step S4 (see FIG. 15), resist 90 can be formed using conductor film 70 formed in the conductor film forming step as a mark, and through-hole 60 can be formed at an appropriate position.

In the above, the specific embodiments of the present application have been described, but the present application is not limited to the above-mentioned embodiments, and various modifications may be made as appropriate without departing from the spirit of the present application.

What is claimed is:
1. A display device comprising:
a first glass substrate including a through-hole;
a wiring disposed in a first main surface of the first glass substrate;
a terminal formed in a second main surface of the first glass substrate and electrically connected to the wiring through the through-hole;
a second glass substrate disposed closer to a display surface side than the first glass substrate and disposed to be opposed to the first main surface of the first glass substrate; and a seal member bonding the first glass substrate and the second glass substrate together,
wherein the seal member and the through-hole overlap with each other in planar view.

2. The display device according to claim 1, further comprising:
a conductor film interposed between the first main surface of the first glass substrate and the wiring, overlapping the through-hole in planar view, and electrically connected to the wiring and the terminal,
wherein the conductor film contains a material having an ionization tendency lower than that of a material contained in the wiring.

3. The display device according to claim 1, further comprising:
a second glass substrate disposed closer to a display surface side than the first glass substrate and disposed to be opposed to the first main surface of the first glass substrate,
wherein an outer periphery of the first glass substrate in which the terminal is disposed and an outer periphery of the second glass substrate overlap with each other in planar view.

4. The display device according to claim 1, further comprising:
a second glass substrate disposed closer to a display surface side than the first glass substrate and disposed to be opposed to the first main surface of the first glass substrate; and
a seal member bonding the first glass substrate and the second glass substrate together,
wherein at least a part of an outer edge of the seal member is disposed on an outer edge side of the first glass substrate with respect to the through-hole in planar view.

5. The display device according to claim 1, further comprising:
a second glass substrate disposed closer to a display surface side than the first glass substrate and disposed to be opposed to the first main surface of the first glass substrate;
a seal member bonding the first glass substrate and the second glass substrate together; and
a conductive film electrically connected to the terminal on the second main surface side of the first glass substrate,
wherein the conductive film and the seal member overlap with each other in planar view.

6. The display device according to claim 1, further comprising:
a conductive film electrically connected to the terminal on the second main surface side of the first glass substrate,
wherein the through-hole and the conductive film do not overlap with each other in planar view.

7. A display device comprising:
a first glass substrate including a through-hole;
a wiring disposed in a first main surface of the first glass substrate;
a terminal formed in a second main surface of the first glass substrate and electrically connected to the wiring through the through-hole; and
a conductor film interposed between the first main surface of the first glass substrate and the wiring, overlapping the through-hole in planar view, and electrically connected to the wiring and the terminal,
wherein the conductor film contains a material having an ionization tendency lower than that of a material contained in the wiring.

* * * * *